(12) United States Patent
Kanda et al.

(10) Patent No.: US 8,009,047 B2
(45) Date of Patent: Aug. 30, 2011

(54) RFID TAG

(75) Inventors: Naoya Kanda, Fujisawa (JP); Noriyuki Oroku, Takasaki (JP)

(73) Assignee: Hitachi, Ltd., Tokyo (JP)

( * ) Notice: Subject to any disclaimer, the term of this patent is extended or adjusted under 35 U.S.C. 154(b) by 381 days.

(21) Appl. No.: 12/211,150

(22) Filed: Sep. 16, 2008

(65) Prior Publication Data

US 2009/0096583 A1    Apr. 16, 2009

(30) Foreign Application Priority Data

Oct. 11, 2007    (JP) ................................ 2007-265071

(51) Int. Cl.
*G08B 13/14* (2006.01)

(52) U.S. Cl. .................................. 340/572.1; 340/572.7

(58) Field of Classification Search ............... 340/572.1, 340/572.7
See application file for complete search history.

(56) References Cited

U.S. PATENT DOCUMENTS

| 2004/0066296 | A1 | 4/2004 | Atherton | |
|---|---|---|---|---|
| 2006/0044769 | A1 | 3/2006 | Forster et al. | |
| 2007/0148981 | A1* | 6/2007 | Rogge | 257/499 |
| 2007/0164413 | A1* | 7/2007 | Arai et al. | 257/679 |

FOREIGN PATENT DOCUMENTS

| EP | 0 977 145 | 2/2000 |
|---|---|---|
| EP | 1 788 514 | 5/2007 |
| JP | 2006-123917 | 5/2006 |
| JP | 2006-159830 | 6/2006 |
| JP | 2006-227037 | 8/2006 |
| JP | 2006-227670 | 8/2006 |
| WO | WO 2005/069204 | 7/2005 |

* cited by examiner

*Primary Examiner* — Thomas J Mullen

(74) *Attorney, Agent, or Firm* — Antonelli, Terry, Stout & Kraus, LLP.

(57) ABSTRACT

For protecting information stored in an RFID chip and ensuring its authenticity, radio communication between the RFID chip and an external terminal is positively interrupted when a seal type RFID tag including the RFID chip is peeled from an adherend, while ensuring solidity integrity when the RFID tag is put on the adherend. In the seal type RFID tag which includes the RFID chip fixed on a mounting surface of a base member having an adhesive layer applied thereto and which is put on the adherend by using the adhesive layer, an antenna formed on a main surface of the RFID chip is embedded in adhesive layers together with the RFID chip and an adhesive bonding strength between the antenna and the adhesive layer is made greater than a joining strength between the antenna and the RFID chip.

6 Claims, 5 Drawing Sheets

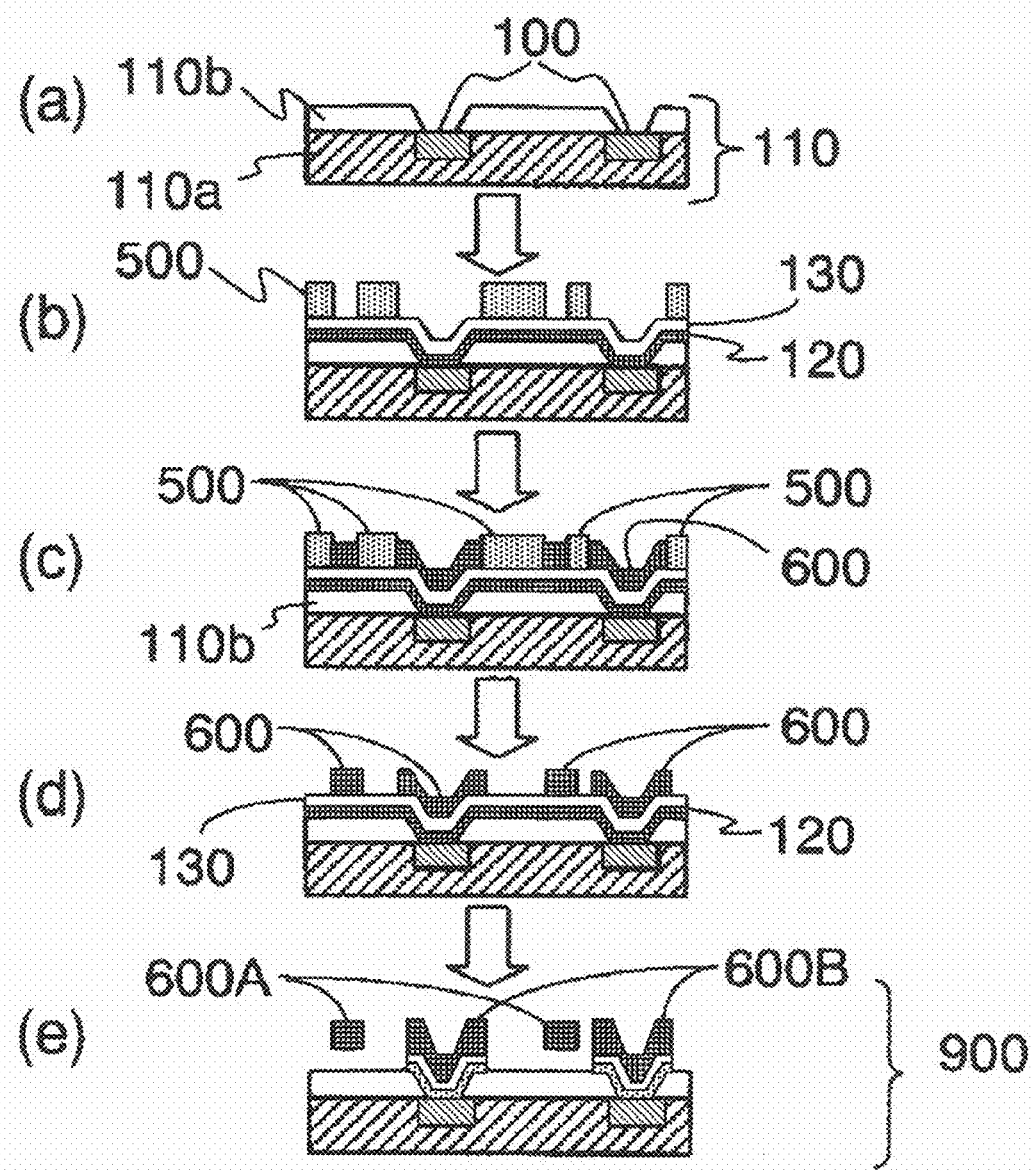

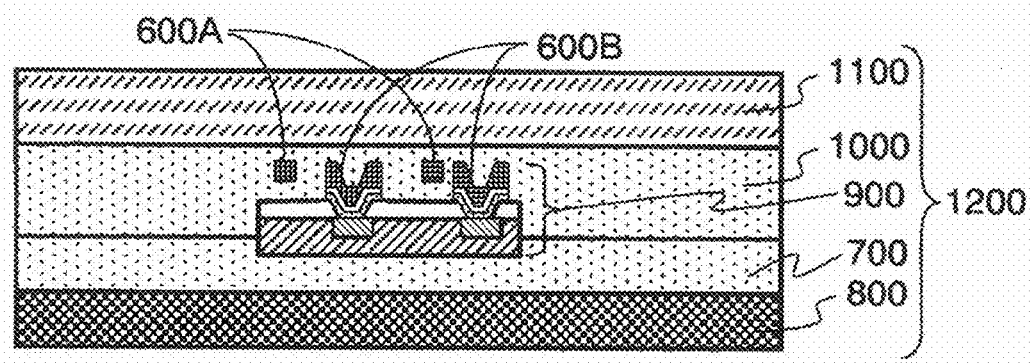
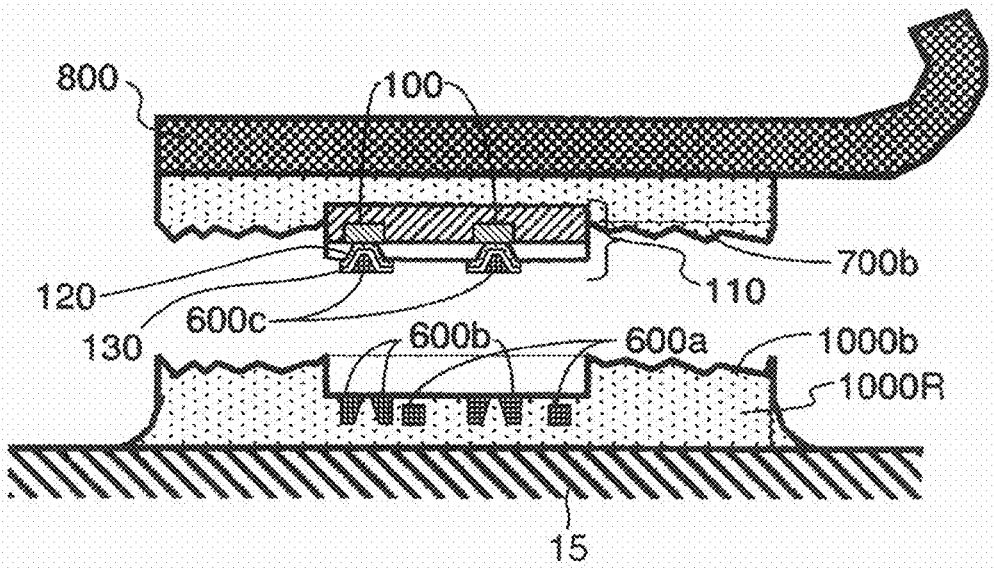

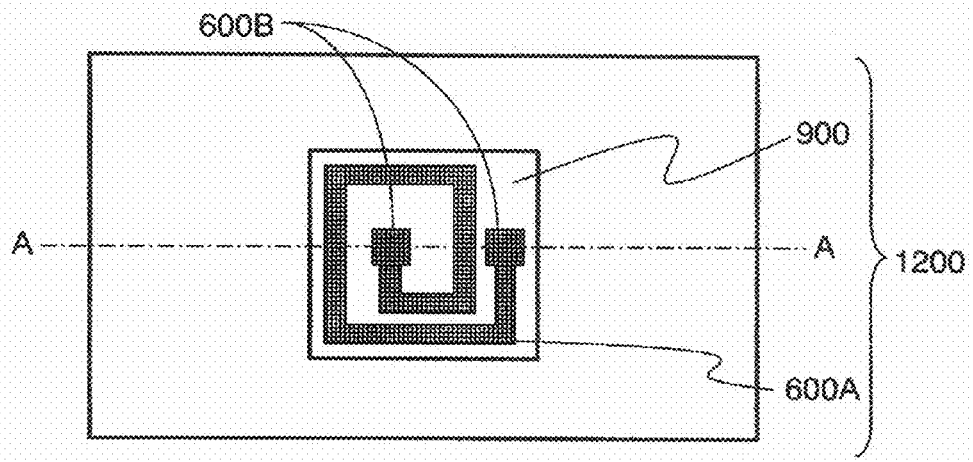
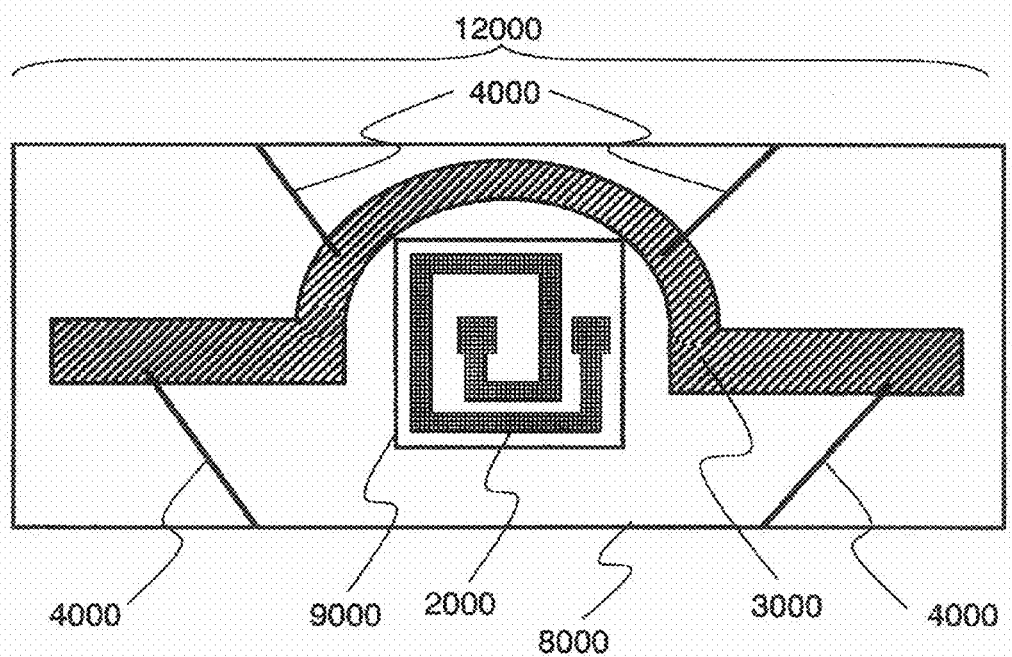

RFID TAG

INCORPORATION BY REFERENCE

The present application claims priority from Japanese application JP2007-265071 filed on Oct. 11, 2007, the content of which is hereby incorporated by reference into this application.

BACKGROUND OF THE INVENTION

The present invention relates to a structure and a manufacturing method of an RFID tag (especially a tag called seal type RFID tag). In particular, the present invention relates to a technique suitable for preventing information stored in an RFID tag which has become unnecessary for management of an adherend from being read out by an external device (i.e., privacy protection) and ensuring that the RFID is not peeled from the load or product adherend (genuineness or authenticity of the RFID) to which it is attached by making the RFID tag unfunctional when a seal is peeled from the adherend.

An RFID tag (Radio Frequency IDentification-tag) which represents a radio IC tag (non-contact type storage chip tag) designed to have a storage medium formed of an integrated circuit (IC) and give and receive information by means of radio between the storage medium and its external circuit (external terminal) is disclosed in JP-A-2006-227037. The RFID tag is spreading in load management and product life cycle management in large scale physical distribution systems. Recently, RFID tags designed so as to facilitate mechanical destruction of an antenna attached thereto are used frequently in order to protect the privacy of shippers in the large scale physical distribution systems and prevent forgery and alteration of products, bills and securities.

As one kind of the RFID tag, a seal type RFID tag formed by providing an adhesive face on a base member or using a base member containing an adhesive member is bonded adhesively to a load or a product, used to manage the load or product together with its external terminal (non-contact type reader and/or writer), then peeled from the load or product, to finish the RFID's role in the management of the load or product. When the seal type RFID tag is used to pack up the load or product (for example, instead of gum tape), the seal type RFID tag is not needed any more by unsealing the packing. It becomes easier for the seal type RFID tag peeled from the management object (load or product) to exchange information with the external terminal as compared with when it is stuck on the management object. Therefore, a fear of illegal readout or falsification of information stored in a storage medium of the seal type RFID tag has risen to the surface.

SUMMARY OF THE INVENTION

An object of the present invention is to positively deprive the seal type RFID tag that is not needed any more by peeling of the seal type RFID tag from the management object or unsealing of the management object of the function of communication with the external terminal in order to protect the privacy stored in the seal type RFID tag or certify the authenticity.

Another object of the present invention is to provide a structure which positively cuts off the RFID chip from the antenna as soon as the seal type RFID tag is peeled from the management object in order to make it possible to confirm the removal of the communication function visually as well.

Storage media (hereafter also referred to as RFID chips) formed of integrated circuit elements mounted on RFID tags, can be broadly classified into a group in which an antenna used for communication between the RFID chip and an external terminal is formed on the RFID chip itself (for example, on a main surface of the RFID chip), and a group in which the antenna is formed on a member other than the RFID chip (for example, on a base member on which the RFID chip is mounted) is so-called disposed outside the RFID chip. Since the antenna disposed outside the RFID chip is comparatively large, it can't be denied that there is a possibility that restoration will be able to be conducted by manual work even if connection between the antenna and the RFID chip is destroyed. On the other hand, the antenna formed on the RFID chip has a firm electrical connection with the RFID chip, and it is difficult to form a fragile part in it. Whichever of the above-described two kinds the antenna provided for the seal type RFID tag is, a possibility that information stored in the RFID chip will be read out or falsified after it is not needed any more can't be denied. The present invention provides an RFID tag (a seal type RFID tag) having a structure suitable for solving these problems.

In view of the objects, the present invention provides RFID tags exemplified hereafter.

This RFID tag includes a chip having an antenna disposed on a side of a first main surface of the chip and a circuit (such as a storage circuit) electrically connected to the antenna, and a base member having a mounting surface to which an adhesive layer is applied, the chip being fixed by the adhesive layer with a second main surface being directed toward the mounting surface.

In the RFID tag, the antenna has a first part electrically connected to the circuit and a second part kept apart from the main surface of the chip.

The chip is embedded in the adhesive layer so as to cause the antenna extending on and over the first main surface to be covered by the adhesive layer.

The RFID tag is put at a surface of the adhesive layer opposite from the base member (the mounting surface) to the adherend. Deformation of the adhesive layer caused when the RFID tag is peeled from the adherend destroys the antenna.

In a first concrete example of an RFID tag according to the present invention, the antenna is formed of a second conductor film obtained by plating a pattern of a first conductor film formed on the first main surface of the chip, the first conductor film is removed from the first main surface of the chip except a part in contact with the first part of the antenna, and the second part of the antenna and the first main surface of the chip are separated from each other by the adhesive layer. In addition, the first conductor film and the second conductor film forming the antenna are joined to each other via a sticking layer, a joining strength between the first conductor film and the second conductor film via the sticking layer is higher than a joining strength between the second conductor film and the adhesive layer, and the joining strength between the second conductor film and the adhesive layer is higher than a joining strength between the adhesive layer and the first main surface of the chip.

The RFID tag according to the first example is characterized by the following manufacturing process. In other words, the main surface of the RFID chip (or a protection film formed on the main surface) and electrodes for antenna connection formed on the main surface (the so-called pads conducted to a circuit provided on the RFID chip, for example, aluminum electrodes) are covered by the first conductor film (a layer of Ti, Cr or the like) which exhibits a high sticking property to the main surface and the electrodes. In addition, an energization layer of Cu or the like may be laminated on the first conductor film. After an antenna pattern is formed on the first conductor film by using a photoresist, a second conductor film serving as the antenna is formed on the first conductor film (or the energization layer) exposed from the first photoresist by electroplating. As a result, electrical connection between the circuit on the RFID chip and the antenna (the second conductor film) is made more firm by strong joining between the electrodes for antenna connection and the first conductor film (the sticking layer of Ti or Cr). Operation of the RFID tag is also stabilized. Furthermore, by removing the first conductor film from parts of the main surface of the RFID chip other than a part on which the electrodes for antenna connection are formed, it is possible to float the part (the second part) of the second conductor film functioning as the antenna from the main surface of the RFID chip and fill the space between them with the adhesive layer. When the RFID tag is peeled from the adherend, therefore, the antenna is destroyed by deformation (extension) of the adhesive layer. For example, the antenna is cut between the first part and the second part.

For forming the sticking layer (the first conductor film) of Ti or Cr and the copper thin film for energization on the main surface of the RFID chip (for example, the wafer), it is desirable to use sputtering or the like. For forming the antenna pattern on the first conductor film or the energization layer (copper thin film) by using plating, it is desirable to use a material having low electrical resistance such as copper or gold. In addition, for removing the sticking layer formed of Ti or Cr from between the antenna pattern formed by plating and the main surface of the RFID chip in a short time, it is desirable to design the antenna pattern so as to accelerate the side etching. For example, if the width of the second part of the antenna (the second conductor film) is made finer than that of the first part (the part for connection to the electrodes for antenna connection), completion of the side etching of the sticking layer is also advanced.

In a second concrete example of the RFID tag according to the present invention, an insulation film having an opening for connecting the circuit to the first part of the antenna is formed on the first main surface of the chip, and the second part of the antenna is formed so as to extend from the opening onto the insulation film. In addition, a conductor film which forms the antenna exhibits stronger adhesive bonding force to the adhesive layer than to the insulation film.

In the RFID tag according to the second example, the antenna in the RFID chip is formed without forming the sticking layer. After completion of the RFID circuit processes (after completion of the RFID chip), metal which reacts with aluminum easily and which is weak in strength of sticking to the protection film of the RFID chip surface such as gold is vapor-deposited on electrodes for antenna connection (aluminum electrodes) exposed from the main surface of the RFID chip (wafer) and an antenna pattern is formed on the gold film by using a photoresist. Thereafter, the gold film is etched through the photoresist pattern by using an iodine-ammonium iodide solution to shape an antenna. The gold film antenna thus formed is easy to peel from the protection film (insulation film) which covers the main surface of the RFID chip. Therefore, it is desirable to prevent unpredicted antenna peeling by leaving the photoresist material used for etching on the protection film without removing the photoresist material and embedding the photoresist material in the adhesive layer together with the gold antenna in order to avoid peeling of the gold film antenna.

In the RFID tag according to the present invention, external force applied so as to peel the RFID tag from the adherend extends an adhesive member which fixes the RFID chip to the base member and fixes the RFID tag to the adherend, and peels the antenna on the RFID chip which sticks fast to the adhesive member from the base member to the adherend side. As a result, joining between the antenna and electrodes for antenna connection of the RFID chip is cut off. Therefore, the peeling external force makes it impossible for an external terminal such as a reader or a reader/writer to read the RFID chip. Thus, privacy protection and falsification prevention are achieved.

Other objects, features and advantages of the invention will become apparent from the following description of the embodiments of the invention taken in conjunction with the accompanying drawings.

BRIEF DESCRIPTION OF THE DRAWINGS

FIG. 5 is a process diagram showing manufacturing processes of an RFID chip with antenna having a sticking layer according to a second embodiment by using changes of its sectional structure;

FIG. 6A is a schematic sectional view showing a shape of a seal tag according to the second embodiment with an RFID chip having an antenna embedded therein;

FIG. 6B is a schematic sectional view of the seal tag according to the second embodiment with the RFID chip having the antenna embedded therein;

FIG. 7 is a schematic plan view of the seal tag according to the second embodiment with the RFID chip having the antenna embedded therein; and FIG. 8 is a schematic plan view of the seal tag according to a third embodiment combined with a booster antenna.

DESCRIPTION OF THE INVENTION

Embodiments of an RFID tag according to the present invention will be described with reference to the drawings.

First Embodiment

Figure 1:
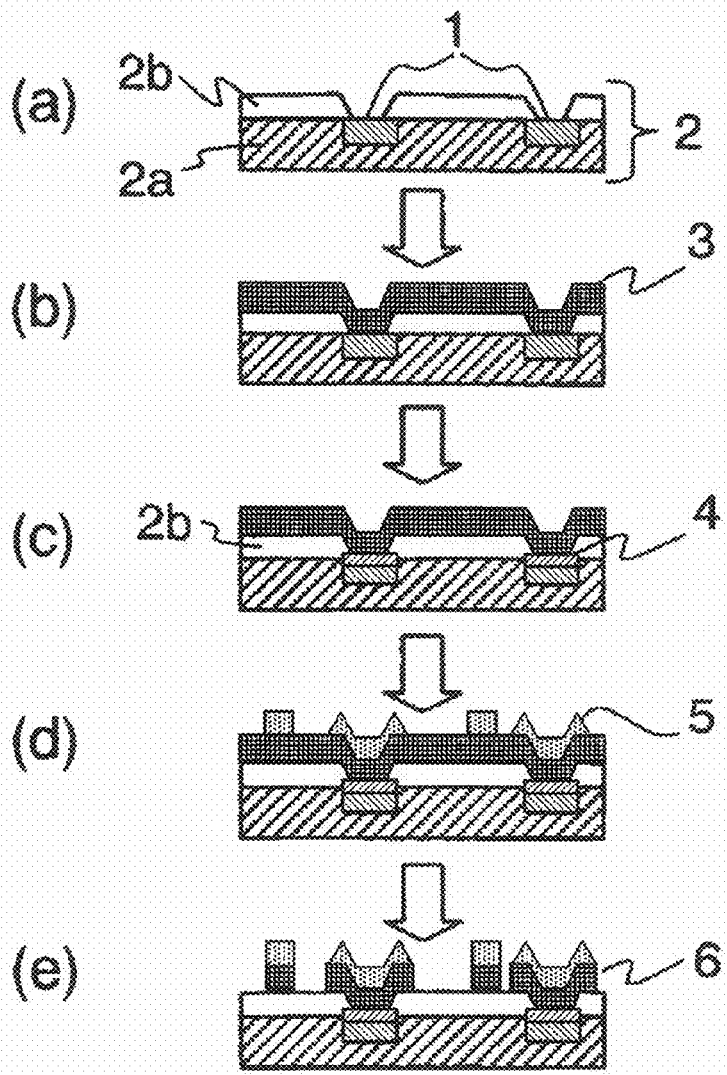
FIG. 1 is a process diagram showing manufacturing processes of an RFID chip with antenna according to a first embodiment by using changes of its sectional structure.
Figure 2:
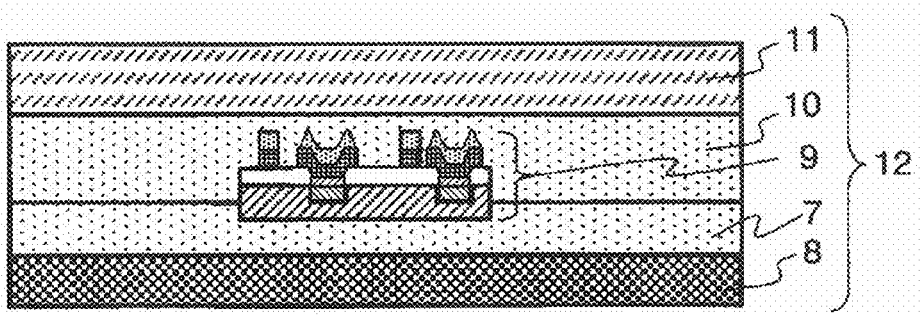
FIG. 2 is a schematic sectional view of a seal type RFID tag (seal tag) according to the first embodiment with an RFID chip having an antenna embedded therein.
Figure 3:
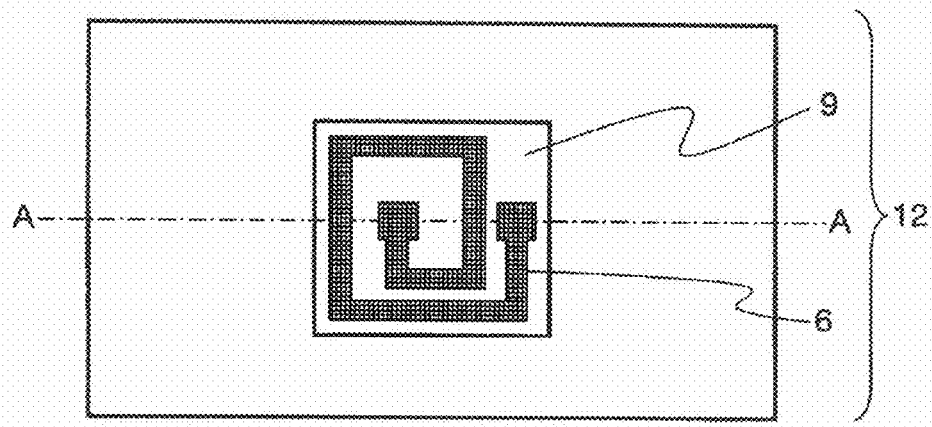
FIG. 3 is a schematic plan view of the seal tag according to the first embodiment with the RFID chip having the antenna embedded therein.
Figure 4:
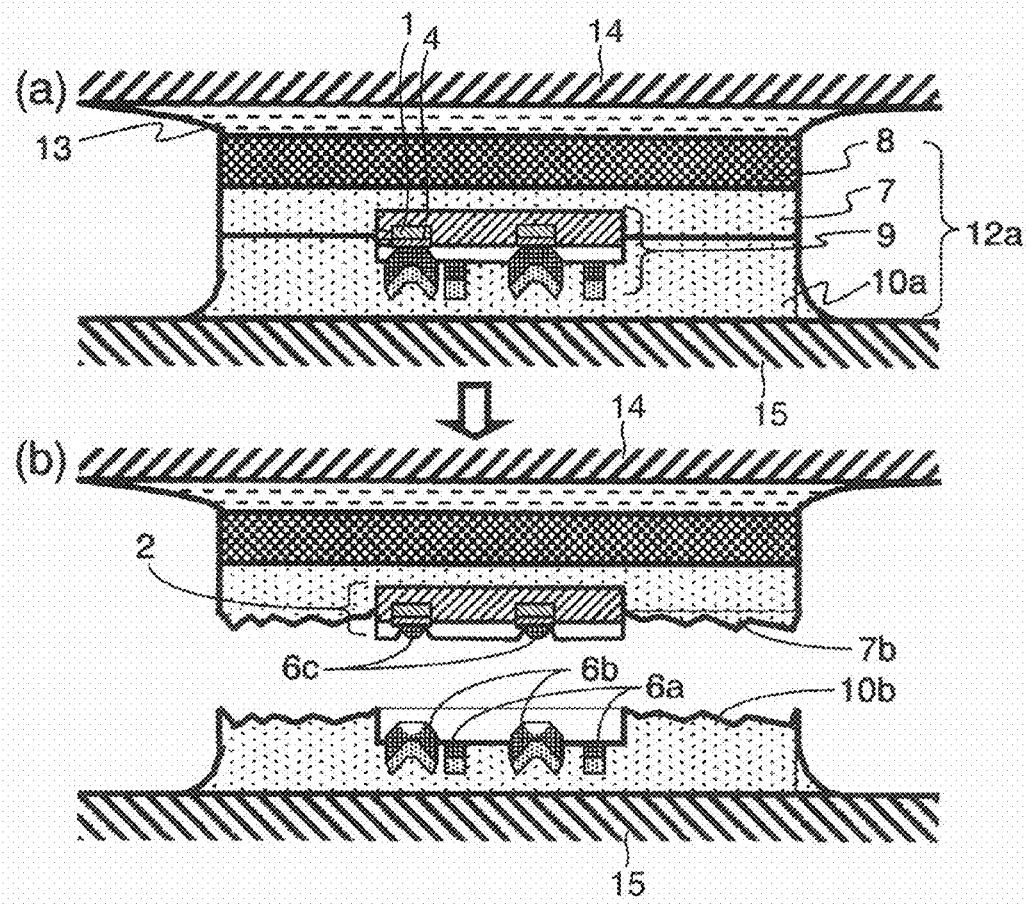
FIG. 4 is a schematic sectional view showing sticking the seal tag according to the first embodiment to an adherend and peeling the seal tag from the adherend.

In the present embodiment, a manufacturing process for forming an RFID tag in which an antenna joined to electrodes formed on a main surface of the RFID chip without a sticking layer, will be described with reference to FIG. 1. In general, the RFID chip (for example, a semiconductor element) is fabricated by using the so-called "wafer unit processing" of forming a plurality of RFID chip circuits on a main surface of a base member (for example, a semiconductor wafer) and then collectively forming antennas on electrodes respectively corresponding to a plurality of RFID chips. A plurality of RFID chips formed in the main surface of the base member are separated into separate RFID chips 9 shown in FIGS. 2 to 4, by cutting the base member. In FIG. 1, the manufacturing process of the RFID chip is shown to be simplified by using a section of an individual piece 2 of a wafer cut out from the base member. However, this illustration does not exclude processing of the photolithographic process of an antenna pattern and so on shown in, for example, the FIG. 1 illustrations (d) and (e) with a wafer taken as the unit. A cross-section of the RFID chip shown in FIG. 1 and cross-sections of seal type RFID tags 12 and 12a each having the RFID chip mounted thereon shown in FIGS. 2 and 4, are cross-section taken along an A-A section line drawn in FIG. 3 which shows a plane structure of the seal type RFID tag 12 together with a perspective image of the main surface of the RFID chip 9 mounted on the RFID tag 12.

The illustration (a) of FIG. 1 shows a section structure of a wafer 2 subjected to the so-called RFID circuit manufacturing process. In the so-called RFID circuit manufacturing process, a plurality of transistors (not illustrated) are formed on the main surface of the base member 2a formed of single crystal of a semiconductor material such as silicon (Si), germanium (Ge), gallium arsenide (GaAs) or gallium nitride (GaN) by using photolithography or the like, and a signal processing circuit and a storage circuit formed of the transistors are provided. A film 2b of a material (for example, an oxide or a nitride of the base member, or an insulative organic material or inorganic material) which exhibits a conductivity lower than that of the base member (for example, semiconductor material) is formed on the main surface of the base member 2a to protect the signal processing circuit and the storage circuit. Openings for exposing the main surface of the base member 2a are provided through the film 2b. A conductor film formed on the main surface of the base member 2a and connected to the signal processing circuit and the storage circuit is exposed through the openings. This conductor film is shown as electrodes 1 for antenna connection. In not only the description of the present embodiment but also the ensuing description of the RFID chips, the base member 2a and the film 2b formed on the main surface of the base member 2a are referred to collectively as wafer 2, and a surface to which the electrodes 1 for antenna connection are exposed is referred to as a main surface of the wafer 2. In the present embodiment, the electrodes 1 for antenna connection are formed of aluminum (Al) or an alloy containing aluminum (Al). However, its material is not especially restricted. When the film 2b is formed of an oxide or a nitride of a semiconductor material comparatively firmly, it is also possible to diffuse impurities to parts of the base member 2a exposed by the openings, through the openings, and to change the parts to the electrodes 1 for antenna connection.

On the main surface of the wafer 2 having the RFID circuit formed thereon, a thin film 3 of gold (Au) is deposited by evaporation so as to have a thickness of approximately 1 micrometer (μm) (see the illustration (b) of FIG. 1). In addition, the wafer 2 is heated at 300° C. for approximately 5 minutes to cause reaction between the gold thin film 3 and aluminum which is the material of the electrodes 1 for antenna connection and form an intermetallic compound 4 at an interface between them (see the illustration (c) of FIG. 1). Since the electrodes 1 for antenna connection are formed of aluminum (Al) or an alloy containing aluminum in the present embodiment, gold which easily reacts with aluminum and which is weak in adherence strength with the film 2b covering the main surface of the wafer 2 is used as the material of the thin film (conductor film) 3.

Thereafter, an antenna pattern is formed on the thin film 3 by using a photoresist 5 (see the illustration (d) of FIG. 1). In addition, the thin film 3 (evaporated gold film) is etched through the pattern of the photoresist 5 by using an iodine-ammonium iodide solution to shape an antenna 6 (see the illustration (e) of FIG. 1). As a result, the antenna 6 which is favorable in electrical connection with the electrodes 1 for antenna connection and which can be easily peeled from a chip protection film (the film 2b) are formed.

As shown in FIG. 2, the RFID chip 9 formed as described above is fixed at a back (the other main surface opposite from the main surface on which the antenna 6 is formed) of the wafer 2 to a main surface of a paper board 8 serving as a base member of the RFID tag by an adhesive member 7. The RFID chip 9 is placed on a top surface of the adhesive member 7 which is applied to the main surface of the paper board 8 before the adhesive member 7 is dried. The adhesive member 7 is dried while the RFID chip 9 is gradually sinking in the applied film of the adhesive member 7. In the RFID tag shown in FIG. 2, the main surface of the RFID chip 9 having the antenna 6 formed thereon (the top surface of the chip protection film 2b formed on the main surface) is exposed from a top surface of the adhesive member 7. However, the RFID chip 9 may be buried in (the applied film of) the adhesive member 7 completely. In addition, an adhesive member 10 is applied to the main surface of the paper board 8 (the top surface of the adhesive member 7). After the applied film is dried moderately, peeling paper 11 is stuck fast to a top surface of the applied film. As a result, the seal type RFID tag (RFID seal tag with antenna) 12 having the RFID chip 9 embedded in the adhesive members 7 and 10 is completed. FIG. 3 shows the plane structure of the seal type RFID tag 12 together with a plane structure (the main surface on which the antenna 6 is formed) of the RFID chip 9 seen through the peeling paper 11 and the adhesive member 10.

The photoresist 5 used for etching in the manufacturing process of the RFID chip 9 is good in the property of sticking to the adhesive member 7 or the adhesive member 10 used for mounting on the RFID tag. By leaving the photoresist 5 on the antenna (conductor film) 6, therefore, the probability that the antenna 6 will be destroyed when the RFID tag 12 is peeled from the adherend becomes high and a high yield in the manufacturing process of the RFID tag 12 is also ensured.

The illustration (a) of FIG. 4 shows a section of the RFID tag 12a according to the present embodiment put on the adherend 15. The illustration (b) of FIG. 4 shows a section of the wreckage (the wafer 2 left on the paper board 8) of the RFID chip 9 deprived of the function of communication with the external terminal (non-contact type reader and/or writer) by being peeled from the adherend 15. The adherend 15 represents a first end of, for example, an envelope or packing paper, and a second end thereof is denoted by a reference numeral 14. For example, the illustration (a) of FIG. 4 shows an envelope sealed by the RFID tag 12a, and the illustration (b) of FIG. 4 shows the envelope unsealed by peeling the RFID tag 12a. The RFID tag 12a shown in the illustration (a) of FIG. 4 does not exhibit appearance of the RFID tag in the illustration (b) of FIG. 4. Herein, however, an aggregate of broken pieces of the RFID tag shown in the illustration (b) of FIG. 4 is referred to as an RFID tag that is not needed any more. By the way, the RFID tag 12 is sold or delivered to a user in a state (an unused state) having the cross-section shown in FIG. 2. Fracture faces 7b and 10b of the adhesive members caused by peeling the RFID tag 12a from the adherend 15 are shown in the (b) of FIG. 4. The two layer adhesive members 7 and 10 are not necessarily fractured along the joining interface between them. As for the conductor film formed as the antenna 6 of the RFID chip 9, its major portions 6a and 6b are transcribed from the main surface of the RFID chip 9 to a layer of the adhesive member left on the main surface of the adherend 15. However, extremely small parts 6c in contact with the intermetallic compound 4 formed between the conductor film and the electrodes 1 for antenna connection remain on the main surface of the RFID chip 9.

The RFID tag 12 shown in FIG. 2 is put on the adherend as shown in the illustration (a) of FIG. 4 by pressing an adhesive member 10a exposed by peeling the peeling paper 11 against the first end 15 of the adherend and pressing an adhesive layer 13 applied to a back of the paper board 8 (a main surface opposite from the surface over which the RFID chip 9 is mounted) against the second end 14 of the adherend. On the other hand, if force is applied between the first end 15 and the second end 14 of the adherend so as to draw them apart from each other, then the RFID tag 12a continues to be kept over the second end 14 of the adherend by the adhesive layer 13, whereas at least one of the adhesive members 7 and 10 or the interface between them is destroyed by the force. Destruction of at least one of the adhesive members 7 and 10 is referred to as cohesive destruction, whereas peeling at the interface between them is referred to as interface destruction.

The antenna 6 joined to the electrodes 1 for antenna connection of the RFID chip 9 via the intermetallic compound layer 4 are broken by the cohesive destruction or the interface destruction of the adhesive members 7 and 10. As a result, it becomes impossible for the RFID chip 9 to communicate with the external terminal. For preventing information stored in the RFID chip 9 included in the RFID tag 12 that is not needed any more from being read out or falsified by the external terminal, it is important to remove the antenna 6 electrically connected to the RFID chip 9 from the main surface of the wafer 2. The RFID tag 12 according to the present invention is configured so as to favorably maintain electrical connections between the RFID chip 9 and the antenna 6 while the RFID tag 12 is affixed to the adherend and so as to leave the RFID chip 9 on the main surface of the paper board 8 and transcribe the conductor film forming the antenna 6 onto the adhesive member 7 or 10 separated from the paper board 8 when the RFID tag 12 is peeled from the adherend.

During conception of the RFID tag 12, the present inventors took note of the following items.

Item 1: For raising the adhesive bonding strength between the adhesive members 7 and 10 and the antenna 6 formed of a metal or an alloy, it is desirable to use an adhesive member that is low in glass transition temperature (Tg).

Item 2: As the adhesive member 7 approaches the adhesive member 10 in the value of solubility parameter ($\delta$, the square-root of cohesive energy), the adhesive bonding strength between them is raised.

Item 3: By increasing the adhesive bonding strength between the photoresist 5 used in patterning and the adhesive members 7 and 10 which are in contact with the photoresist 5, it becomes easy for the antenna 6 to be transcribed to the adhesive members 7 and 10.

By using the RFID chip 9 including the wafer 2 of a semiconductor material, the chip protection film 2b formed of an oxide or a nitride of a semiconductor material formed on the main surface of the wafer 2, and the antenna 6 formed of a metal such as gold or an alloy which is low in strength of adhesive bonding to the chip protection film 2b on the chip protection film 2b, the RFID tag 12 is fabricated with due regard to the three items. Hereafter, the RFID tag 12 thus fabricated will be exemplified.

In its first example, an imitation formed of polyethylene terephthalate (PET, $\delta$=10.7) is used as the paper board 8, butyl polyacrylic acid ($\delta$=8.8 to 9.1, Tg=−57° C.) is used as the adhesive member 7, and an epoxy adhesive ($\delta$=9.7) is used as the adhesive member 10. Since the glass transition temperature (Tg) of the epoxy adhesive is not lower than 100° C. either, the RFID chip 9 inclusive of the antenna 6 is covered by the adhesive member 7. The adhesive member 7 formed of butyl polyacrylic acid fixes the RFID chip 9 to the paper board 8 formed of polyethylene terephthalate. On the other hand, cohesive destruction is caused in a part of the adhesive member 7 in contact with the adhesive member 10 formed of the epoxy adhesive by force exerted upon the part through the adhesive member 10 from the first end 15 of the adherend. A major part of the thin film of the metal or alloy which forms the antenna 6 is transcribed to the fracture face formed on a part of the adhesive member 7 which sticks to the adhesive member 10 and which is peeled from the RFID chip 9.

In a second example, the paper board 8 formed of genuine paper (cellulose, $\delta$=15.6), the adhesive member 7 formed of polyacrylonitrile ($\delta$=15.4), and the adhesive member 10 formed of cis-1,4-polyisoprene ($\delta$=18, Tg=−47 to −24° C.) are used. In the second example, at least the top surface of the RFID chip 9 is exposed from the adhesive member 7 together with the antenna 6 formed on the top surface in order to bring the adhesive member 10 having a glass transition temperature of 0° C. or less into contact with the antenna 6. Force exerted upon the adhesive member 10 from the first end 15 of the adherend causes interface destruction between the adhesive member 10 and the adhesive member 7 or cohesive destruction in the adhesive member 7. In either case, a major part of the thin film of a metal or an alloy forming the antenna 6 is transcribed to the adhesive member 10.

The RFID chip 9 is not restricted to the above-described structure either. For example, it is also possible to form the chip protection film 2b of a resin having a high glass transition temperature such as epoxy resin or acrylic resin and form the antenna 6 on the chip protection film 2b by using the screen printing or the like. In this case, the selection range of the conductive material forming the antenna 6 is widened.

On the other hand, as for the peeling paper 11, its material is selected or the joining face between the peeling paper 11 and the adhesive member 10 is subjected to surface processing so as to cause the adhesive bonding strength between the peeling paper 11 and the adhesive member 10 to become less than the adhesive bonding strength between the adhesive member 10 and the RFID chip 9 and the adhesive bonding strength between the adhesive members 7 and 10. As the material of the peeling paper 11, silicone resin, ethylene tetrafluoride resin, or the like can be utilized. As the peeling paper 11, paper (cellulose) coated with silicone resin or a copolymer of a long-chain alkyl derivative of maleic acid at the joining face between the peeling paper 11 and the adhesive member 10 is also used.

The adhesive layer 13 is formed of an adhesive which does not cause cohesive destruction in the adhesive layer 13 and interface destruction between the adhesive layer 13 and the paper board 8 and between the adhesive layer 13 and the second end 14 of the adherend before the cohesive destruction in the adhesive members 7 and 10, the interface destruction between the adhesive members 7 and 10, and the interface destruction between the adhesive members 7 and 10 and the RFID chip 9 (the chip protection film 2b) occur. The RFID tag 12 may not be bonded adhesively to the adherend 14 by the adhesive layer 13 unlike FIG. 4. For example, if the paper board 8 is made wider than the film of the adhesive member 10 and used as the so-called pull-tab of the RFID tag 12, it is possible to deprive the RFID chip 9 of the function of communication with the external terminal by drawing apart the paper board 8 from the adherend 15.

Second Embodiment

In the present embodiment, electrodes (electrodes for antenna connection) formed on the main surface of the RFID chip are connected to an antenna disposed on the main surface with a sticky layer (for example, an additional metal or alloy layer) between.

Manufacturing processes of the RFID chip, a structure of an RFID tag (a seal type RFID chip) on which the RFID chip is mounted, and a form of putting the RFID tag to the adherend will now be described with reference to FIGS. 5 to 7. A section of the RFID chip 900 (wafer 110) shown in FIG. 5 and a section of a seal type RFID tag 1200 having the RFID chip mounted thereon shown in FIG. 6 representing a cross-sectional view taken along an A-A section line drawn in FIG. 7 which shows a plane structure of the seal type RFID tag 1200 together with a perspective image of the main surface of the RFID chip 900 mounted on the RFID tag 1200. Herein, the sticking layer means a body which makes a joining strength of a pair of members joined via the sticking layer (for example, hardness of occurrence of interface destruction between a member A and the sticking layer and interface destruction between the sticking layer and a member B) higher than a joining strength between the pair of members (for example, hardness of occurrence of interface destruction between the member A and the member B). The material of the sticking layer is not especially restricted together with each of the members. In most RFID chips according to the present invention, however, each of the sticking layer and members joined via the sticking layer is formed of a metal or an alloy.

FIG. 5 shows various stages of a manufacturing process of the RFID chip 900 in the present embodiment as a change of a sectional structure of the wafer 110 serving as a base member of the RFID chip 900.

The illustration (a) of FIG. 5 shows a section structure of a wafer 110 subjected to the so-called RFID circuit manufacturing process. In the so-called RFID circuit manufacturing process, a plurality of transistors (not illustrated) are formed on the main surface of the base member 110a formed of single crystal of a semiconductor material described in the first embodiment by using photolithography or the like, and a film 110b of a material (for example, an oxide or a nitride of the base member, or an insulative organic material or inorganic material) which exhibits a conductivity lower than that of the base member is formed on the main surface to protect the signal processing circuit and the storage circuit. In the same way as the first embodiment, collectively "wafer 110" in the present embodiment is also defined as having the base member 110a and a film formed on the main surface of the base member 110a (hereafter referred to as chip protection film) 110b. Openings for exposing the main surface of the base member 110a are provided through the chip protection film 110b which covers the main surface. A conductor film (electrodes 100 for antenna connection) formed on the main surface of the base member 110a and connected to the signal processing circuit and the storage circuit is exposed through the openings. In the present embodiment as well, the electrodes 100 for antenna connection are formed of aluminum (Al) or an alloy containing aluminum (Al). However, its material is not especially restricted. When the chip protection film 110b is formed of an oxide or a nitride of a semiconductor material comparatively firmly, it is also possible to diffuse impurities to parts of the base member 110a exposed by the openings, through the openings and change the parts to the electrodes 100 for antenna connection.

The difference between the manufacturing process of the RFID chip 900 in the present embodiment and that in the first embodiment appears in the illustration (b) of FIG. 5 and ensuing diagrams. As shown in the illustration (b) of FIG. 5, a sticking layer 120 formed of Ti, Cr or the like having a thickness of approximately 50 nm is formed on the main surface (the chip protection film 110b) of the wafer 110 from which the electrodes 100 for antenna connection are exposed. A copper thin film 130 described later having a thickness of approximately 100 nm is formed on the sticking layer 120. The sticking layer 120 and the copper thin film 130 are formed by using the sputter method or the like. An antenna pattern is formed on the copper thin film 130 by using a plating resist 500. Thereafter, the top surface of the wafer 110 which exhibits a section shown in the illustration (b) of FIG. 5 is immersed in an electrolytic solution containing a conductor material. The surface of the copper thin film 130 exposed by the plating resist 500 is plated by the conductor material according to a potential difference between the surface of the copper thin film 130 and another electrode immersed in the electrolytic solution. It is desirable to use a conductor (such as a metal or an alloy) which is hard to corrode and low in electric resistance like gold as a conductor material used for electroplating on the main surface of the wafer 110. As a result, an antenna 600 of the RFID chip 900 is formed as shown in the illustration (c) of FIG. 5.

The illustration (d) of FIG. 5 shows the section of the wafer 110 with the plating resist 500 peeled. Under the antenna 600, a laminated structure which includes the copper thin film 130 used for forming the antenna (film formation using electroplating) and the sticking layer 120 serving as an underlying film for the copper thin film 130 spreads over the whole of the main surface of the wafer 110. A part which does not contribute to electrical connection between the antenna 600 and the electrodes 100 for antenna connection in the laminated structure, i.e., the part sandwiched between the antenna 600 and the protection film 110b is removed by etching in order to prevent the laminated structure from attenuating or intercepting electromagnetic waves propagated between the antenna 600 and the external terminal. Especially in removal of the sticking layer 120 of Ti or Cr which strongly bonds with an adjacent conductor layer by using etching, it is important to actively advance side etching of the sticking layer 120 formed under the antenna 600. It is desirable to conduct etching for a long time. It is desirable to use an aqueous solution mixed with sulfuric acid and hydrogen peroxide in etching of the sticking layer 120 formed of Ti and containing Ti as the main component. It is desirable to use an alkaline permanganate aqueous solution in etching of the sticking layer 120 formed of Cr and containing Cr as the main component. As a result, especially the sticking layer 120 located right under the antenna pattern can be removed easily.

The illustration (e) of FIG. 5 shows the section of the wafer 110 with, so to speak, an unnecessary part of the sticking layer 120 and the copper thin film 130 removed by etching. As for the antenna (plated layer) 600 shown in the illustration (c) and the illustration (d) of FIG. 5, parts (terminals for antenna connection) connected to the electrodes 100 for antenna connection via the copper thin film 130 and the sticking layer 120 and a remaining part (antenna pattern in a narrow sense) are provided with different reference numerals. The latter cited part (antenna pattern) is denoted by 600A, whereas the former cited parts (terminals for antenna connection) are denoted by 600B. In the laminated structure removing process, the side etching of the sticking layer 120 is advanced even in the vicinity of the electrodes 100 for antenna connection of the RFID chip 900. However, the side etching of the sticking layer 120 in the vicinity of the antenna pattern 600A is completed relatively fast by designing shapes (pattern of the plating resist 500) so as to make fine (suppress) the plane spread of the antenna pattern 600A as compared with that of the terminals 600B for antenna connection. In other words, since the laminated structure formed of the closed contact layer 120 and the copper thin film 130 is left with a sufficient area between the electrodes 100 for antenna connection and the terminals 600B for antenna connection, the communication function between the RFID chip 900 and the external terminal is maintained positively.

FIG. 6A shows a sectional structure of the RFID tag 1200 having the RFID chip (antenna incorporating chip) 900 mounted therein. FIG. 6B shows a sectional shape obtained when the RFID tag 1200 put on the adherend 15 is peeled from the adherend 15. Reference numerals 600a to 600c denote members derived from the antenna (plating layer) in a broad sense in the same way as 600A and 600B described above. However, definition of the reference numerals 600a to 600c will be described later. As for the RFID chip 900, the bottom face (a face opposite from the main surface on which the antenna 600 is formed) of the wafer 110 is pressed against an adhesive member 700 applied onto a seal member 800. Thereafter, one layer of an adhesive member 1000 is applied to an antenna face (the main surface on which the antenna 600 is formed) of the wafer 110 and a top surface of the adhesive member 700 in the undried state. Thereafter, the adhesive members 700 and 1000 are dried while keeping moderate viscoelasticity in the adhesive member 1000. And the top surface of the adhesive member 1000 is stuck fast to the peeling paper 1100. As a result, the seal type RFID tag (seal tag) 1200 having the antenna embedded in the adhesive member shown in FIG. 6A is completed. In the present embodiment, the antenna 600 is formed by electroplating. Therefore, unevenness caused on the surface (growth surface) of the antenna 600 widens the area of contact between the antenna 600 and the adhesive member 700 or the adhesive member 1000 in contact with the antenna 600. Since an antenna formed by evaporation or sputtering has good flatness and a lustrous surface, kinds of adhesive members which can be bonded adhesively to the antenna with a high strength are also limited. Since the surface of the antenna 600 becomes coarse, however, the selection range of the adhesive member which exhibits a high adhesive bonding strength to the surface is also widened. For example, even an epoxy resin having a high glass transition temperature (Tg) bonds adhesively to the antenna 600 intensely. As a result, destruction of the RFID chip 900 caused by transcription of the antenna 600 (especially the antenna pattern 600A) to the adhesive member is facilitated.

In the RFID tag 1200, it is recommended to direct the antenna 600 (antenna surface) to the opposite side from the seal member 800 of the wafer 110 (the base member of the RFID tag 1200) as shown in FIG. 6A. However, the antenna 600 may be opposed to the seal member 800 according to the use, and a definite effect is brought about. The RFID tag 1200 according to the present embodiment is sold or delivered to a user in a state (an unused state) having the section shown in FIG. 6A. The RFID tag 1200 according to the present embodiment is not needed any more when it exhibits the section shown in FIG. 6B.

Use of the RFID tag 1200 according to the present embodiment is nearly the same as that of the RFID tag 12 according to the first embodiment. For example, it is also possible to apply an adhesive to the back of the seal member 800 and bond both the adhesive and the adhesive member 1000 to the adherend. FIG. 6B exemplifies the RFID tag 1200 having the seal member 800 which extends to the outside of the film of the adhesive member 1000 as a "pull-tab." In the RFID tag 1200 according to the present embodiment including the RFID chip 900 which has the antenna 600 formed by electroplating, how the antennas 600 are broken when the RFID tag 1200 is peeled from the adherend 15 also differs somewhat from that in the first embodiment. First, since the antenna pattern 600A is embedded in at least one of the adhesive members 700 and 1000, the antenna pattern 600A is removed cleanly from the RFID chip 900 without leaving traces. Its remains 600a are buried in a residue 1000R which sticks to the adherend 15. As for the terminals 600B for antenna connection as well, the adhesive members 700 and 1000 transcribe greater parts 600b of their residue to the residue 1000R of the adhesive member. However, parts 600c of the residue are left on the electrodes 100 for antenna connection on the main surface of the RFID chip 900 by the sticking layer 120 which is in contact with the terminals 600B for antenna connection via the copper thin film 130. As a result, greater parts of the antenna 600 formed by using the plating resist 500 are transcribed to the adherend 15 (the residue 1000R of the adhesive member), and a part which forms the antenna pattern 600A vanishes from the main surface of the RFID chip 900. Therefore, information stored in the RFID chip 900 is not read out or falsified by the external terminal. As long as external force is not applied to the RFID tag 1200 to peel the RFID tag 1200 from the adherend 15, in other words, as long as a layer formed of the adhesive members 700 and 1000 is not destroyed, electric connection between the antenna 600 and the RFID chip 900 (the electrodes 100 for antenna connection) is maintained and its solidity (reliability) is further raised by the sticking layer 120.

In the RFID tag 1200 according to the present embodiment, materials respectively exemplified as the paper board 8, the adhesive members 7 and 10, and the peeling paper 11 in the first embodiment can be utilized for the seal member 800, the adhesive members 700 and 1000, and the peeling paper 1100. The selection range of the adhesive members 700 and 1000 is further widened as compared with that in the first embodiment.

Third Embodiment

The RFID tag (12, 1200) described in the first embodiment and the second embodiment exchanges signals (information) with the external terminal by using a loop-shaped or spiral-shaped antenna mounted on the RFID tag. However, the carrier frequency of radio communication using the loop-shaped or spiral-shaped antenna is restricted to the HF band (3 to 30 MHz). If the distance between the RFID tag (12, 1200) and the external terminal is not kept within several cm, signals are not exchanged between them.

On the other hand, in the RFID tag having a dipole antenna, radio communication with the external terminal can be conducted at a carrier frequency in the UHF band (300 to 3000 MHz). Even if the RFID tag is at a distance of several meters from the external terminal, therefore, signals are exchanged between them.

As shown in FIG. 8, an RFID tag 12000 according to the present embodiment is formed by mounting an RFID chip 9000 as described in the first embodiment and the second embodiment on a sheet 8000 having an external antenna 3000 (a booster antenna) formed on its main surface. The external antenna 3000 can be inductively coupled to an antenna 2000 formed in the RFID chip 9000. The RFID chip 9000 is bonded adhesively at a surface which is opposite from its antenna surface to the main surface of the sheet 8000 by using a first adhesive member (for example, the adhesive member 7 in the first embodiment). The main surface of the sheet 8000 is covered by the first adhesive member in parts except the part on which the RFID chip 9000 is mounted. The external antenna 3000 formed on the main surface by using a conductor paste such as silver (Ag) is also covered by the first adhesive member. The external antenna 3000 includes a part which extends along the fringe of the RFID chip 9000 (stipulated as an inductive coupling part and illustrated as a semicircular part) and a pair of parts (stipulated as a communication part) which extend from both ends of the semicircular part. The length of the external antenna 3000 is defined as a distance between one end and the other end of the communication part. A frequency band in which radio communication is possible depends upon the length.

A top surface of the first adhesive member applied to the main surface of the sheet 8000 and the antenna surface of the RFID chip 9000 bonded adhesively to the top surface of the first adhesive member are covered by a second adhesive member (for example, the adhesive member 10 in the first example). In addition, peeling paper is put on a film of the second adhesive member. The RFID tag 12000 is put at the top surface of the second adhesive member exposed by peeling the peeling paper, on an adherend which is not illustrated. In this state, the RFID chip 9000 conducts radio communication with the external terminal, for example, a reader or a reader/writer via the antenna 2000 formed on the main surface of the RFID chip 9000 and the external antenna 3000 magnetically coupled to the antenna 2000.

On the other hand, the RFID tag 12000 is deprived of the function of radio communication with the external terminal by destruction of the antenna 2000 in the RFID chip 9000 caused when the RFID tag 12000 is peeled from the adherend. In other words, most of the conductor film which forms the antenna 2000 remains on the adherend in the state in which it is bonded adhesively to the second adhesive member. In the peeled RFID tag 12000, electromagnetic coupling between the RFID chip 9000 and the external antenna 3000 is lost. Therefore, the RFID chip cannot recognize the electric field induced in the external antenna 3000 by a radio wave transmitted from the external terminal.

As a technique for intercepting the communication between the RFID chip 9000 and the external terminal more positively, it is recommended to form notches 4000 which overlap the external antenna 3000 on at least a back of the sheet 8000 (a surface opposite from the main surface on which the external antenna 3000 is formed). Since the back of the sheet 8000 tends to attract attention, it is utilized as a label sometimes. In the RFID tag 12000 with the first adhesive member or its equivalent applied to the main surface of the sheet 8000, the notches 4000 may range from the back to the main surface, and further to the external antenna 3000. As long as excessive force, i.e., force which peels the RFID tag 12000 from the adherend is not applied to the RFID tag 12000, the first adhesive member temporarily restores partial cut parts in the sheet 8000 and the external antenna 3000. Even if notches 4000 enter the external antenna 3000, therefore, an electric field is induced in the external antenna 3000 in response to the radio wave received from the external terminal. If the RFID tag 12000 is peeled from the adherend, then the notches 4000 restored temporarily by the first adhesive member cut the sheet 8000 to pieces, destroy the external antenna 3000, and completely cut off the communication between the RFID chip 9000 and the external terminal.

The RFID seal tag according to the present invention can be utilized as a privacy protecting tag which prevents information from being read inadvertently by peeling the RFID seal tag and an authenticity ensuring tag which ensures that the RFID seal tag has not been unsealed.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An RFID tag comprising:
   a chip having an antenna disposed on a side of a first main surface of the chip and a circuit electrically connected to the antenna; and
   a base member having a mounting surface to which an adhesive layer is applied, the chip being fixed by the adhesive layer with a second main surface of the chip being directed toward the mounting surface,
   wherein
   the antenna has a first part electrically connected to the circuit and a second part kept apart from the first main surface of the chip,
   the chip is embedded in the adhesive layer so as to cause the antenna extending on and over the first main surface to be covered by the adhesive layer,
   an insulation film having an opening for connecting the circuit to the first part of the antenna is formed on the first main surface of the chip,
   the second part of the antenna is formed so as to extend from the opening onto the insulation film, and
   a conductor film which forms the antenna exhibits a stronger bonding force to the adhesive layer than to the insulation film.

2. The RFID tag according to claim 1, wherein
   the antenna is formed of a second conductor film obtained by plating a pattern of a first conductor film formed on the first main surface of the chip,
   the first conductor film is removed from the first main surface of the chip except a part in contact with the first part of the antenna, and
   the second part of the antenna and the first main surface of the chip are separated from each other by the adhesive layer.

3. The RFID tag according to claim 2, wherein
   the first conductor film and the second conductor film forming the antenna are joined to each other via a sticking layer,
   a joining strength between the first conductor film and the second conductor film via the sticking layer is higher than that between the second conductor film and the adhesive layer, and
   the joining strength between the second conductor film and the adhesive layer is higher than that between the adhesive layer and the first main surface of the chip.

4. The RFID tag according to claim 1, wherein the adhesive layer is formed by laminating a plurality of layers of adhesive members which are different from each other in kind, on the mounting surface of the base member.

5. The RFID tag according to claim 1, wherein
   an external antenna which is different from the antenna provided in the chip is formed on the mounting surface of the base member, and
   the external antenna is embedded in the adhesive layer and electromagnetically coupled to the antenna provided in the chip.

6. The RFID tag according to claim 5, wherein
   the antenna provided in the chip is formed to take a shape of a loop, and
   the external antenna is a rod-shaped antenna having a first part which extends along a periphery of the antenna provided in the chip and second parts which respectively extend from both ends of the first part.

\* \* \* \* \*